United States Patent
Eriksson et al.

(10) Patent No.: US 6,698,770 B2
(45) Date of Patent: Mar. 2, 2004

(54) CART AND CARRIER FOR MEDICAL EQUIPMENT

(75) Inventors: Bernt Eriksson, Järfälla (SE); Ulf Österberg, Storvreta (SE); Daniel Höglund, Stockholm (SE); David Crafoord, Stocksund (SE)

(73) Assignee: Siemens Elema AB, Solna (SE)

( * ) Notice: Subject to any disclaimer, the term of this patent is extended or adjusted under 35 U.S.C. 154(b) by 20 days.

(21) Appl. No.: 10/086,404

(22) Filed: Mar. 1, 2002

(65) Prior Publication Data

US 2002/0125664 A1 Sep. 12, 2002

(30) Foreign Application Priority Data

Mar. 7, 2001 (SE) ............................................. 0100758

(51) Int. Cl.$^7$ ............................................. B62D 39/00
(52) U.S. Cl. ............................. 280/33.991; 280/33.992; 280/47.35
(58) Field of Search ........................ 280/33.991, 33.992, 280/33.996, 33.998, 47.35, 47.38, 43.14, 47.28, 47.29, 79.5, 79.11, 79.2, 651, 79.7, 659, 656, 769, 654, DIG. 5; 224/526, 411; 220/482, 23.4

(56) References Cited

U.S. PATENT DOCUMENTS

| | | | | |
|---|---|---|---|---|
| 2,911,130 A | * | 11/1959 | Kitazono | ..................... 224/526 |
| 3,648,869 A | * | 3/1972 | Christianson et al. | .. 280/33.991 |
| 3,853,329 A | * | 12/1974 | McDonald | ............... 280/47.35 |
| 4,108,277 A | * | 8/1978 | Goldstein et al. | ............. 182/82 |
| 4,504,073 A | * | 3/1985 | Isaacs | ..................... 280/33.992 |
| 4,986,555 A | * | 1/1991 | Andreen | ................... 280/47.35 |
| 5,294,145 A | * | 3/1994 | Cheng | ......................... 280/654 |
| 5,320,475 A | | 6/1994 | Pinder | |
| 5,326,117 A | * | 7/1994 | Cook | ........................ 280/79.2 |
| 5,366,123 A | * | 11/1994 | Range | .................... 280/33.992 |
| 5,465,987 A | * | 11/1995 | DellaVecchia | ........... 280/47.28 |
| 5,727,642 A | * | 3/1998 | Abbott | ................... 280/DIG. 5 |
| 5,765,868 A | * | 6/1998 | Ventrone et al. | ............ 280/769 |
| 5,848,797 A | * | 12/1998 | Paez | ...................... 280/33.993 |
| 5,860,659 A | * | 1/1999 | Hart | .......................... 280/79.5 |
| 5,893,572 A | * | 4/1999 | Parks | ...................... 280/47.18 |
| 6,073,942 A | * | 6/2000 | Heneveld, Sr. | ........ 280/33.991 |
| 6,224,071 B1 | | 5/2001 | Dummer | |

FOREIGN PATENT DOCUMENTS

| | | |
|---|---|---|
| DE | 196 49 982 | 6/1998 |
| EP | 0 281 536 | 9/1988 |
| EP | 0 755 812 | 1/1997 |
| GB | 2 189 198 | 10/1987 |
| SE | 599 886 | 6/1978 |

* cited by examiner

Primary Examiner—Brian L. Johnson
Assistant Examiner—Hau Phan
(74) Attorney, Agent, or Firm—Schiff Hardin LLP

(57) ABSTRACT

In a cart and a carrier for medical equipment, the carrier has a bottom section and a back section and a pair of wheels and is arranged on an axle at the junction between the bottom section and the back section. The axle functions as a pivot axle and the back section as a lever for lifting the entire bottom section off the floor when the carrier is moved. Smooth and convenient interaction between the cart and carrier is achieved because the cart has a receiving part and a first locking part, and the carrier has a coupling arrangement and a second locking part. The coupling arrangement can be inserted into the receiving part and serves as a pivot axle for the carrier. The carrier locks to the cart when the second locking part is moved toward the first locking part when the carrier is lifted around the pivot axle.

9 Claims, 3 Drawing Sheets

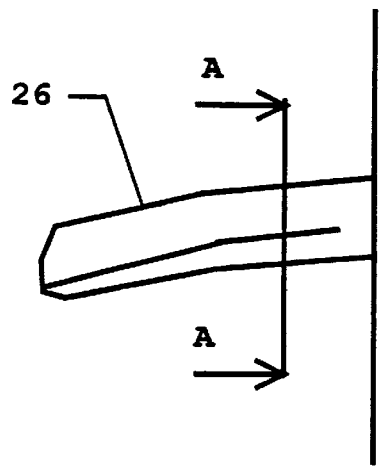
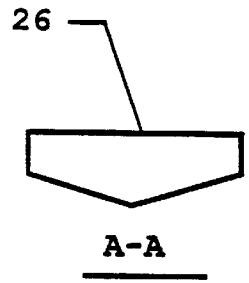
FIG. 3A          FIG. 3B
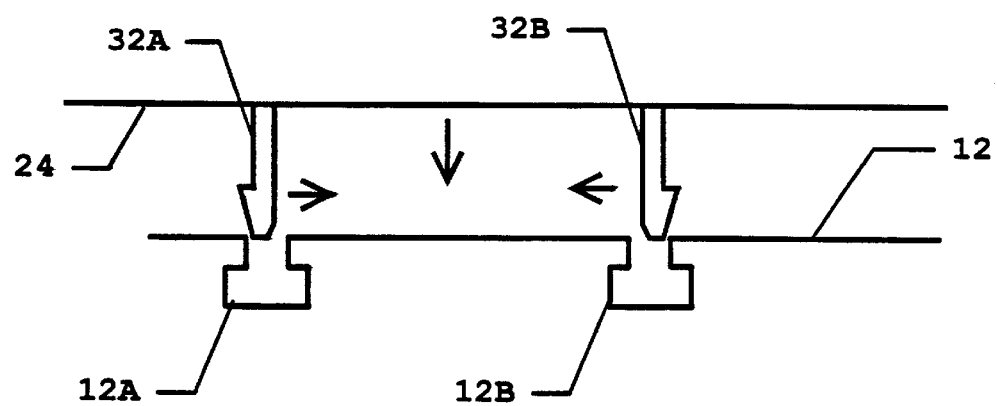
FIG. 4

CART AND CARRIER FOR MEDICAL EQUIPMENT

BACKGROUND OF THE INVENTION

1. Field of the Invention

The present invention relates to a cart, and a carrier and a cart and a carrier combination of the type suitable for transporting medical equipment.

2. Description of the Prior Art

The need for medical equipment in intensive care and in other care is mainly governed by the patient's condition. As used herein, "patient" refers both to people and animals. The equipment configuration must be changed when the patient's condition changes. At the same time, space around the patient is limited, and the possible need to move the patient to another location must also be kept in mind.

There is accordingly a need in the health care sector for an ability to configure equipment smoothly and simply and to adapt it to prevailing needs (any change in the patient's condition, transport etc.).

SUMMARY OF THE INVENTION

An object of the present invention is to provide a cart for medical equipment, which can be smoothly and simply adapted to varying needs.

Another object of the present invention is to provide a carrier for medical equipment, which can be smoothly and simply adapted to varying needs.

Another object of the invention is to provide a cart and carrier combination making possible easy adaptation to varying needs for medical equipment for different purposes (intensive care, transport etc.).

The first object is achieved in accordance with the principles of the present invention in a cart for medical equipment having a receiving part adapted to receive a coupling element of a carrier for medical equipment, and a first locking part adapted to interact with a second locking part on the carrier for locking the carrier to the cart, the second locking part being movable toward the first locking part when the carrier is moved around a pivot axle formed by the coupling element after it is received in the receiving part, the receiving part being disposed so that no part of the carrier touches the floor after the carrier has been locked to the cart.

The design with a receiving part and a first locking part makes it possible to combine the cart with a carrier enabling equipment, occupying a minimum amount of space, to be taken to the desired location without impeding movement of all the equipment (cart and carrier).

The receiving part can be a groove with an essentially convex shape. This design makes interaction of the carrier and cart less sensitive, since the groove guides the carrier to the correct position, in relation to the cart, for locking the carrier to the cart.

The first locking part is suitably formed by two vertical channels with openings narrower than the width of the channels. One channel is sufficient, but two provide better symmetry and stability.

The second object is achieved in accordance with the principles of the present invention in a carrier for medical equipment having a bottom section, a back section and a pair of wheels arranged at the junction between the bottom section and the back section, the axle of the pair of wheels serving as a pivot axle and the back section serving as a lever for lifting the entire bottom section off of the floor when the carrier is transported, and having a coupling element adapted to be inserted into a receiving part on a cart, thereby forming a pivot axle for the carrier, and a second part adapted to interact with a first locking part on the cart to lock the carrier to the cart, the second locking part being movable toward the first part when the carrier is lifted around the pivot axle, so that no part of the carrier touches the floor after the carrier has been locked to the cart.

A design with a coupling arrangement and a second locking part makes it possible to combine the carrier with a cart, enabling equipment, occupying a minimum amount of space, to be easily taken to the desired location without impeding movement of all the equipment (cart and carrier). Since the coupling arrangement functions as a pivot axle and the back section as a torque arm, even relatively heavy equipment (such as gas cylinders) can be easily connected to the cart by lifting the carrier on the pivot axle.

The coupling arrangement can be a tongue with a slight bend or curvature, thereby keeping the carrier from sliding off the receiving part when the carrier is lifted. This thereby reduces the risk of accidents and injuries to staff and damage to equipment. The tongue can have an underside corresponding to the lower part of a convex groove on the cart. Coupling will then be more secure, and the locking parts are automatically guided towards each other when the carrier is lifted.

The second locking part can be a hook. This is particularly suitable when the first locking part is devised as a channel with an opening narrower than the width of the channel. Two hooks are suitably employed when two channels are arranged on the cart. The hooks are then suitably devised to point in opposite directions.

The hook(s) can be pre-tensioned with springs in the locking direction. Beveling the edges of the hooks makes it easy to insert them straight into the channels against spring force until they reach the locking position. A release device easily detaches the carrier from the cart by disengaging the hooks, and the carrier can then be lowered towards the floor.

Adapting the equipment to be carried is most suitably accomplished by providing the carrier with interchangeable mounting units. For example, the carrier could be equipped with a mounting unit for gas cylinders when a patient is to be moved to another location. The gas cylinders then supply a ventilator on the cart with gas during the move.

The third object is achieved in accordance with the principles of the present invention in a carrier and cart combination for medical equipment, wherein the carrier has a bottom section and a back section and a pair of wheels arranged at an axle at the junction between the bottom section and the back section, the axle serving as a pivot axle and the back section as a lever for lifting the entire bottom section off of the floor when the carrier is moved, the cart having a receiving part and the carrier having a coupling element which is received in the receiving part, and the carrier having a first locking part which interacts with a second locking part on the carrier to lock the carrier to the cart.

DESCRIPTION OF THE DRAWINGS

FIG. 3A is a side view of a coupling element on the carrier of the invention.

FIG. 3B is a sectional view taken along lines A—A of FIG. 3A, of the coupling element of the carrier of the invention.

FIG. 4 shows part of a second locking part on the carrier of the invention.

DESCRIPTION OF THE PREFERRED EMBODIMENTS

Figure 1:
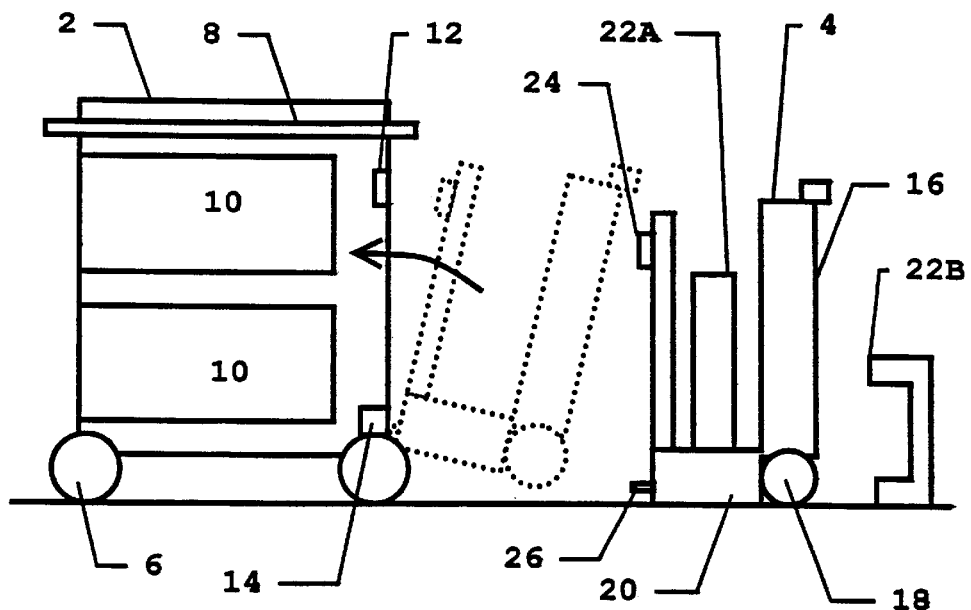
FIG. 1 shows a cart and a carrier according to the invention.

As FIG. 1 shows, the invention relates to a cart 2 and a carrier 4 for medical equipment. The dotted outline shows that the carrier 4 can be coupled to the cart 2 to form a handier and more maneuverable combination than the cart 2 and the carrier 4 separately. This is particularly advantageous in medical contexts.

The cart 2 has wheel 6 making the cart 2 simpler and easier to move to a desired location, e.g. next to a hospital bed in an intensive care unit. The wheels 6 are advantageously lockable. To facilitate handling, the cart 2 can be equipped with a handle 8. Various shelves 10, or the equivalent, can be devised for the medical equipment the cart is to carry, such as a ventilator, patient monitor and battery pack (backup power in the event of a power failure) The cart 2 is devised with a first locking part 12 and a receiving part 14 for coupling the cart 2 to the carrier 4. They are described in greater detail below.

The carrier 4 is basically formed of a back section 16, a pair of wheels 18 and a bottom section 20. The carrier 4 can also be equipped with a mounting unit 22A for medical equipment, e.g. gas cylinders for supplying gas to a ventilator (on the cart 2) while a patient is being moved to another location. The mounting unit 22A can be replaced with other mounting units 22B for other equipment. Alternately, different carriers 4 can be used for different equipment.

The pair of wheels 18 serves as a pivot axle for the carrier 4, and the back section 16 serves as a lever. The carrier 4 is therefore easy to move even when carrying heavy equipment.

The carrier 4 has a second locking part 24 and a coupling element 26. The coupling element 26 fits the receiving part 14 on the cart 2 (as designated by the dotted carrier outline) and functions as a pivot axle for the carrier 4 after it latches into the receiving part 14. The carrier 4 can then be easily lifted, thereby advancing the second locking part 24 toward the first locking part 12 in order to lock the carrier 4 to the cart 2.

Figure 2:
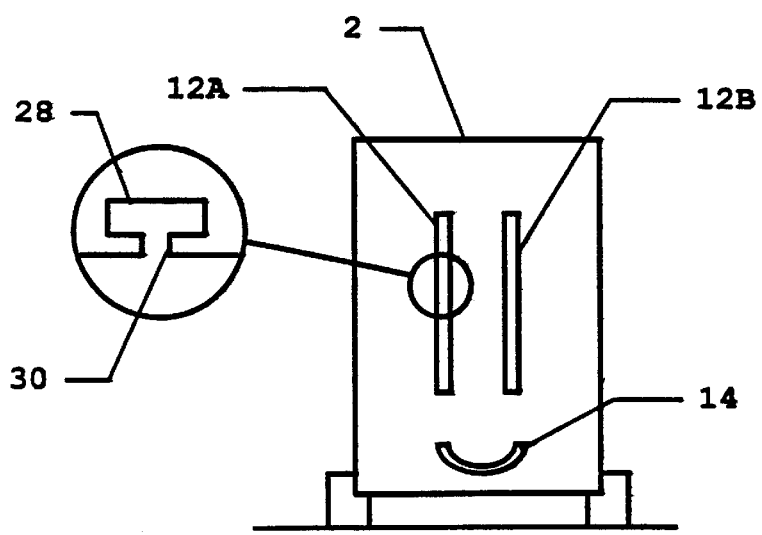
FIG. 2 shows a receiving part and a first locking part on the cart of the invention.

FIG. 2 shows the receiving side of the cart 2. Here, it is evident that the receiving part 14 can consist of an essentially convex groove. The convex shape ensures that the carrier is automatically centered in the correct position for locking to the cart 2.

In this embodiment, the first locking part 12 has of two channels 12A, 12B. The enlarged cross-section of the first channel 12A shows that the channels 12A, 12B have a T shape, the channel 28 itself being wider than the opening 30.

FIGS. 3A and 3B show one embodiment of the coupling element 26. In this version, the coupling element 26 is formed as a projecting tongue, slightly curved at the front. The slight curvature ensures that the coupling element 26 does not slide out of the receiving part on the cart when someone starts lifting the carrier. The cross-section A—A also shows that the base of the coupling element 26 can be convex. The convexity is suitably tailored to the corresponding convexity of the receiving part in FIG. 2. This ensures more stable coupling of the carrier 2 and cart 4.

Figure 5:
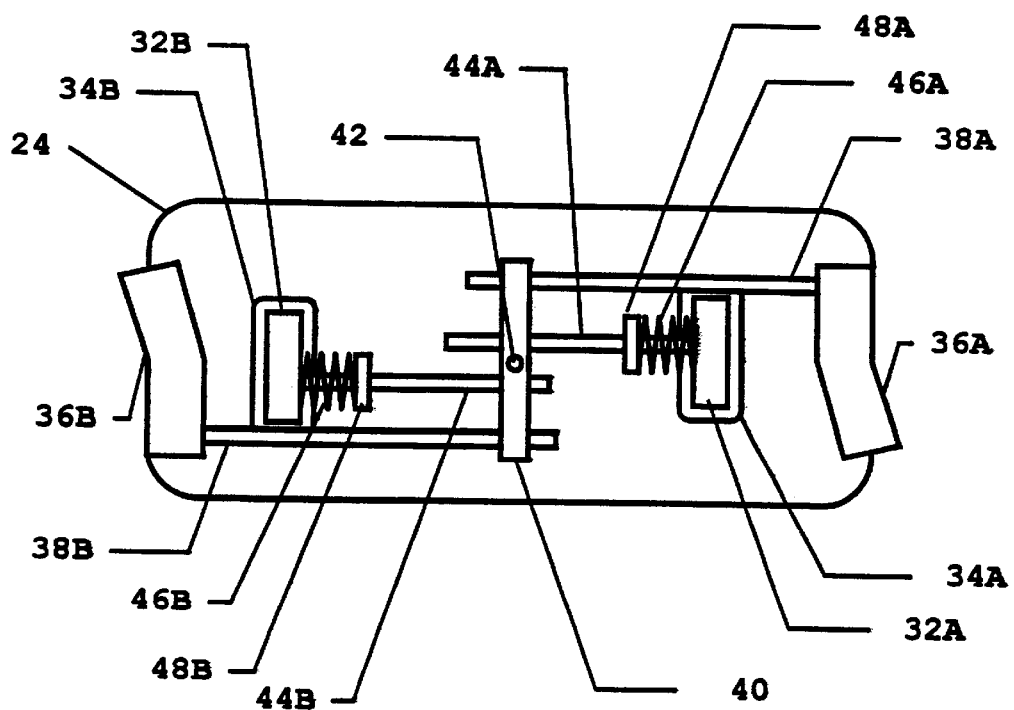
FIG. 5 shows additional details of the second locking part on the carrier of the invention.

FIGS. 4 and 5 show the second locking part 24 from different angles, and (FIG. 4) shows how the second locking part 24 interacts with the first locking part 12. The second locking part 24 has two pistons 32A, 32B that fit the channels 12A, 12B in the first locking part 12. In coupling, the pistons 32A, 32B are moved to one side in order to enter the channels 12A, 12B. The pistons 32A, 32B are beveled to provide suitable guidance and side movement. When the pistons 32A, 32B have entered the channels 12A, 12B far enough, they fall back and lock the carrier to the cart.

The pistons 32A, 32B project from holes 34A, 34B in the second locking part 24 (FIG. 5) and can also be acted upon by the release elements 36A, 36B (for detaching the pistons 32A, 32B from the first locking part when the carrier is to be removed from the cart). The release elements 36A, 36B can act (individually), by means of a first coupling link 38A, 38B, on a lever 40 mounted on a pivot axle 42. When the release elements 36A, 36B are pressed, the lever 40 is drawn around the pivot axle 42. Respective second coupling links 44A, 44B is also are connected to the lever 40. The respective second coupling links 44A, 44B are attached to the respective pistons 32A. 32B.

The pistons 32A, 32B are pre-tensioned with springs 46A, 46B. The springs 46A, 46B are located between the pistons 32A, 32B and stops 48A, 48B. When the lever 40 is pulled around the pivot axle 42, the second coupling links 44A, 44B and the pistons 32A, 32B respectively are pulled against the pre-tension.

Although modifications and changes may be suggested by those skilled in the art, it is in the intention of the inventors to embody within the patent warranted hereon all changes and modifications as reasonably and properly come within the scope of their contribution to the art.

We claim as our invention:

1. A cart for medical equipment comprising:

a cart body adapted to rest on a floor;

a receiving part on said cart body adapted to receive a coupling element on a carrier for medical equipment;

a first locking part on said cart body adapted for interaction with a second locking part on said carrier for locking said carrier to said cart body;

said receiving part causing said coupling element to form a pivot axle for said carrier after said coupling element is received in said receiving part; and said receiving part having a substantially convex groove having a lowest point, said convex groove being adapted to guide said coupling element to said lowest point; and said first locking part being adapted to allow said second locking part to move toward said first locking part as said carrier is moved around said pivot axle, and being disposed so that when said second locking part is locked to said first locking part, no part of said carrier touches said floor.

2. A carrier for medical equipment comprising:

a carrier body having a bottom section and a back section joined to each other at a junction;

an axle disposed at said junction on which a pair of wheels are rotatably mounted, said axle serving as a pivot axle and said back section serving as a lever for lifting an entirety of said bottom section off of a floor for transporting said carrier body;

a coupling element on said carrier body adapted for insertion into a receiving part on a cart to form a further pivot axle for said carrier; and a second locking part on said carrier body adapted for interaction with a first locking part on said cart to lock said carrier body to said cart, said second locking part being adapted for movement toward said first locking part as said carrier body is lifted around said further pivot axle, so that no part of said carrier body touches the floor after said carrier body is locked to said cart.

3. A carrier as claimed in claim 2 wherein said coupling element is tongue-shaped and has a curved front to prevent said coupling element from sliding out of said receiving part.

4. A carrier as claimed in claim 2 wherein said second locking part has at least one piston adapted for insertion into said first locking part to lock said carrier body to said cart.

5. A carrier as claimed in claim 4 wherein said second locking part comprises a spring arrangement for biasing said piston in a locking position, and a release element for detaching said piston from said first locking part, said piston having a beveled edge.

6. A carrier as claimed in claim 2 further comprising a plurality of interchangeable mounting units on said carrier body adapted to receive different types of medical equipment.

7. A carrier as claimed in claim 2 further comprising a mounting unit on said carrier body adapted to carry a gas cylinder.

8. A cart and carrier combination for medical equipment, comprising:
   a carrier having carrier body with a bottom section and a back section connected at a junction and an axle mounted at said junction with a pair of wheels rotatably mounted on said axle, said axle serving as a pivot axle and said back section serving as a lever for lifting an entirety of said bottom section off of a floor when said carrier is transported;
   a cart having a cart body adapted to rest on said floor;
   said cart body having a receiving part and said carrier body having a coupling element receivable in said receiving part to couple said carrier to said cart;
   said cart body having a first locking part and said carrier body having a second locking part which interacts with said first locking part to lock said carrier to said cart when said coupling element is received in said receiving part; and
   said coupling element in said receiving part forming a further pivot axle and said second locking part being movable toward said first locking part as said carrier is moved around said further pivot axle so that when said cart and said carrier are locked together, no part of the carrier touches the floor.

9. A cart for medical equipment comprising:
   a cart body adapted to rest on a floor;
   a receiving part on said cart body adapted to receive a coupling element on a carrier for medical equipment;
   a first locking part on said cart body adapted for interaction with a second locking part on said carrier for locking said carrier to said cart body;
   said receiving part causing said coupling element to form a pivot axle for said carrier after said coupling element is received in said receiving part; and
   said first locking part having a vertical channel having a width, and an opening that is narrower than said width, said first locking part being adapted to allow said second locking part to move toward said first locking part as said carrier is moved around said pivot axle, and being disposed so that when said second locking part is locked to said first locking part, no part of said carrier touches said floor.

* * * * *